United States Patent [19]

Saccomanno et al.

[11] Patent Number: 5,715,082
[45] Date of Patent: Feb. 3, 1998

[54] MICROSCOPE ATTACHED SLIDE DOTTING DEVICE

[75] Inventors: Geno Saccomanno, 778 26 1/2 Rd., Grand Junction, Colo. 81501; Ronald S. Merrell, Provo; Kris Nosack, Orem, both of Utah

[73] Assignee: Geno Saccomanno, Grand Junction, Colo.

[21] Appl. No.: 545,310

[22] Filed: Oct. 19, 1995

[51] Int. Cl.⁶ .......................... G02B 21/26; G02B 21/00
[52] U.S. Cl. .................... 359/391; 359/368; 359/393
[58] Field of Search ............................. 359/368, 391, 359/393, 397

[56] References Cited

U.S. PATENT DOCUMENTS

| | | | |
|---|---|---|---|
| 3,438,690 | 4/1969 | Skerman | 359/391 |
| 4,262,426 | 4/1981 | Miyazaki | 33/189 |
| 4,807,979 | 2/1989 | Saccommo et al. | 359/368 |

FOREIGN PATENT DOCUMENTS 1472289  2/1969  Germany .................. 359/391

*Primary Examiner*—Thong Nguyen
*Assistant Examiner*—Mark Robinson

[57] ABSTRACT

A microscope attached slide dotting device includes a clamping ring arranged for selective mounting onto a microscope barrel having an objective lens. The clamping ring includes cooperative first and second semi-cylindrical members arranged for clamping about the microscope barrel. The second semi-cylindrical member employs a mounting boss provided with opposed dovetail projections slidably and complementarily received within a slide plate. The slide plate includes opposed first plate flanges to receive the dovetail projections projecting from a first side of the slide plate, with a second side of the slide plate projecting at a dovetail boss for complementary and slidable reception within a housing recess of an associated marker housing. The marker housing includes a marker assembly extending through the marker housing. A plurality of clamping members permits orthogonal and slidable relationship of the marker housing relative to the clamping ring via slide plate. The marker assembly slidably and retractably includes a marking wick extending from the marker assembly below the clamping ring, such that manual displacement of the marker assembly directs the marking wick onto an underlying microscope slide for indicating purposes. The marker assembly further employs a plurality of springs, wherein one of the springs retracts the assembly, with the second of the springs effecting cushioning of the wick as it is directed to engage the microscope slide.

20 Claims, 4 Drawing Sheets

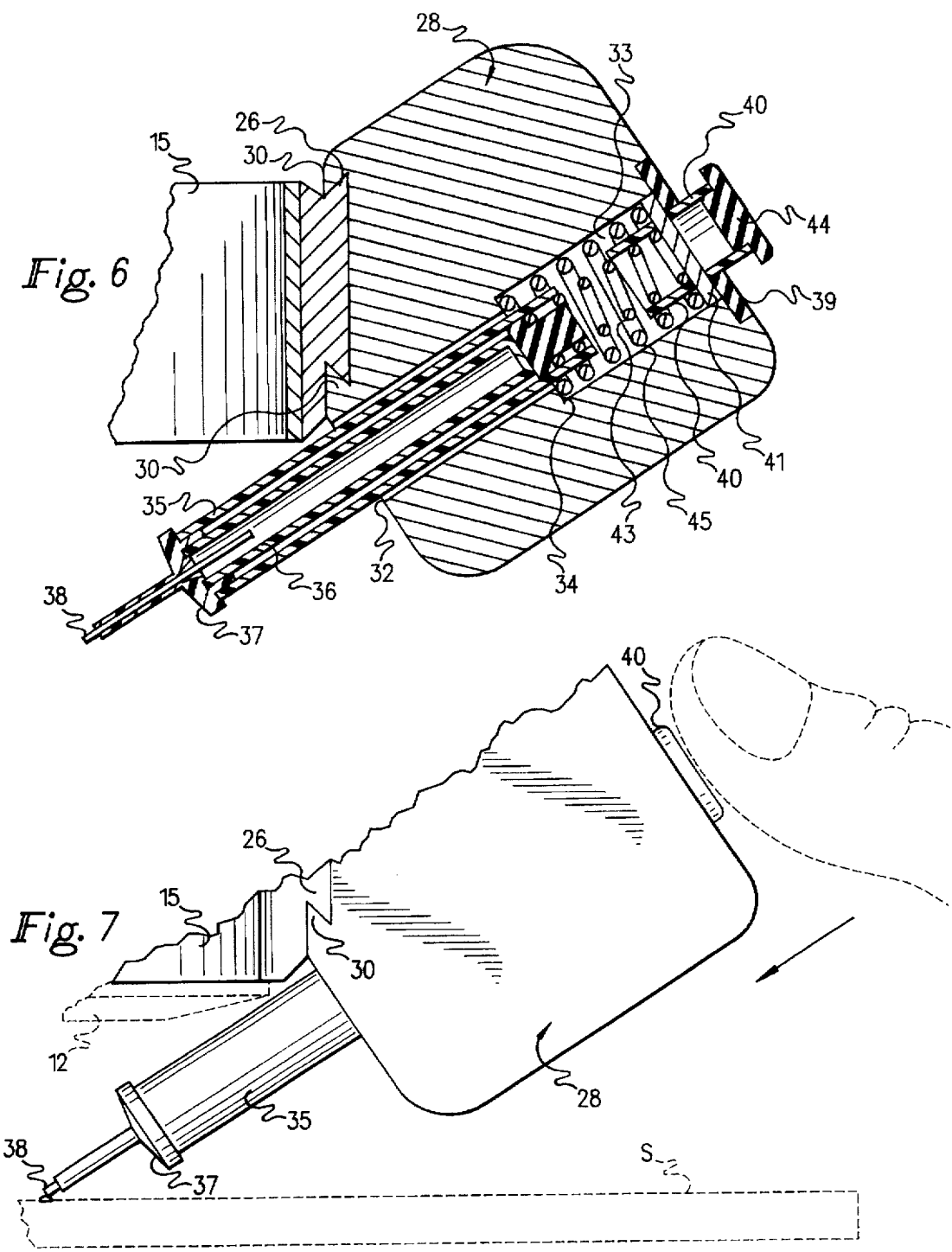

MICROSCOPE ATTACHED SLIDE DOTTING DEVICE

BACKGROUND OF THE INVENTION

1. Field of the Invention

The present invention relates to the reference indication of microscope slides, and more particularly relates to a device arranged for retrofit to an associated microscope tube adjacent an objective lens of that microscope tube permitting selective dispensing of indicator marking for referencing of an associated microscope slide structure positioned adjacent to the objective lens.

2. Description of the Prior Art

Scientific research and inspection work typically performed in a laboratory is directed to the examination of substances to include organisms relative to research of various endeavors. A microscope slide to this end is viewed and scanned to note objects of interest. When such objects of interests are detected on a microscope slide, it is highly desirable to mark the slide structure adjacent such objects for referencing to include further and subsequent review. To find such objects subsequent to a scanning of a slide is typically encumbered by the slide having been rotated, displaced, and manipulated in such a manner that time is lost without the referencing of the slide adjacent the object permitting its ease of recall. Such referenced marking has been indicated in the prior art to permit the object's relocation for subsequent review. To this end, various prior art systems have been employed such as manual marking with inherent deficiencies associated therewith relative to a researcher that must in fact divert attention from viewing through attendant loss of time, inconsistency of marking, and various deficiencies associated therewith.

Computerized analysis of microscope scanning has been employed in the prior art, wherein a microscope slide subsequent to initial scan with the slide substance and its associated configuration computer imaged for ease of identification and marking, with such marking directed to a computer memory for permitting subsequent recall for further analysis and review. While such systems are effective and accurate, they are simultaneously burdensome, expensive, and require training for their use, with attendant loss of time relative to laboratory research.

U.S. Pat. No. 4,690,521 to Saccomanno and subsequent U.S. Pat. No. 4,807,979 granted to Saccomanno, et al., is directed to a microscope slide marking device providing a clamping ring for attachment to a microscope. An ink cartridge structure mounted relative to the clamping ring is provided to include a plunger mechanism, in turn utilizing pivot structure permitting orientation of the plunger and marker relative to a slide structure. Calibration screws and springs are utilized to position and lock the plunger mechanism in place relative to an associated microscope slide for subsequent use. The calibration structure to include the springs screws, and the like set forth a simplified version of a microscope marking and scanning relative to computer generation as priorly noted, but this structure and its attendant calibration requirements are still a time consuming process relative to the slide marking procedure.

U.S. Pat. No. 4,262,426 to Miyazaki sets forth an alternative to the aforementioned manual marking and automated systems permitting attached relative to an objective lens of an associated microscope. A housing is mounted about the microscope adjacent that lens, wherein a plunger and marking structure mounted relative to the housing permits marking of an associated microscope slide. The housing structure is disadvantaged by its construction of a fixed nature therefore not accommodating mounting relative to the microscope, wherein a lens of the microscope is significantly larger than the housing. Further, if the object lens of the microscope is of a reduced size relative to the housing, an associated set screw structure is incapable of providing a secure foundation relative to the microscope, whereupon indicator marks would be of a less precise orientation relative to the slide structure when employed. The aforementioned set screw mounting mechanism is inappropriately configured relative to its action to an objective lens of a microscope that is provided with a threaded exterior. Further, the Miyazaki patent and its associated marker construction is afforded minimal control relative to the location and orientation of reference marks to be made, as well as their size and therefore the device accordingly provides limited adjustability in use.

A need remains for a microscope slide marking structure that is both compact, convenient, and arranged for ease of use relative to available prior art.

SUMMARY OF THE INVENTION

A microscope attached slide dotting device includes a clamping ring arranged for selective mounting onto a microscope barrel having an objective lens. The clamping ring includes cooperative first and second semi-cylindrical members arranged for clamping about the microscope barrel. The second semi-cylindrical member employs a mounting boss provided with opposed dovetail projections slidably and complementarily received within a slide plate. The slide plate includes opposed first plate flanges to receive the dovetail projections projecting from a first side of the slide plate, with a second side of the slide plate projecting at a dovetail boss for complementary and sliceable reception within a housing recess of an associated marker housing. The marker housing includes a marker assembly extending through the marker housing. A plurality of clamping members permits orthogonal and slidable relationship of the marker housing relative to the clamping ring via the slide plate. The marker assembly slidably and retractably includes a marking wick extending from the marker assembly below the clamping ring, such that manual displacement if the marker assembly directs the marking wick onto an underlying microscope slide for indicating purposes. The marker assembly further employs a plurality of springs, wherein one of the springs retracts the assembly, with the second of the springs effecting cushioning of the wick as it is directed to engage the microscope slide.

It will be understood that the invention may be embodied in other specific forms without departing from the spirit or central characteristics thereof. The present examples and embodiments, therefore, are to be construed in all respects as illustrative and not restrictive, and the invention is not to be limited to details given herein but may be modified within the scope of the append claims.

BRIEF DESCRIPTION OF THE DRAWINGS

FIG. 6 is a cross-sectional view indicating the marker assembly, taken along the lines 6—6 as indicated in FIG. 3 in the direction as indicated by the arrows.

FIG. 7 is a partial side view of the marker housing and associated marker assembly illustrating a user projecting the marker assembly relative to the marker housing for associated marker of an underlying microscope slide.

DETAILED DESCRIPTION OF THE PREFERRED EMBODIMENTS

Figure 1:
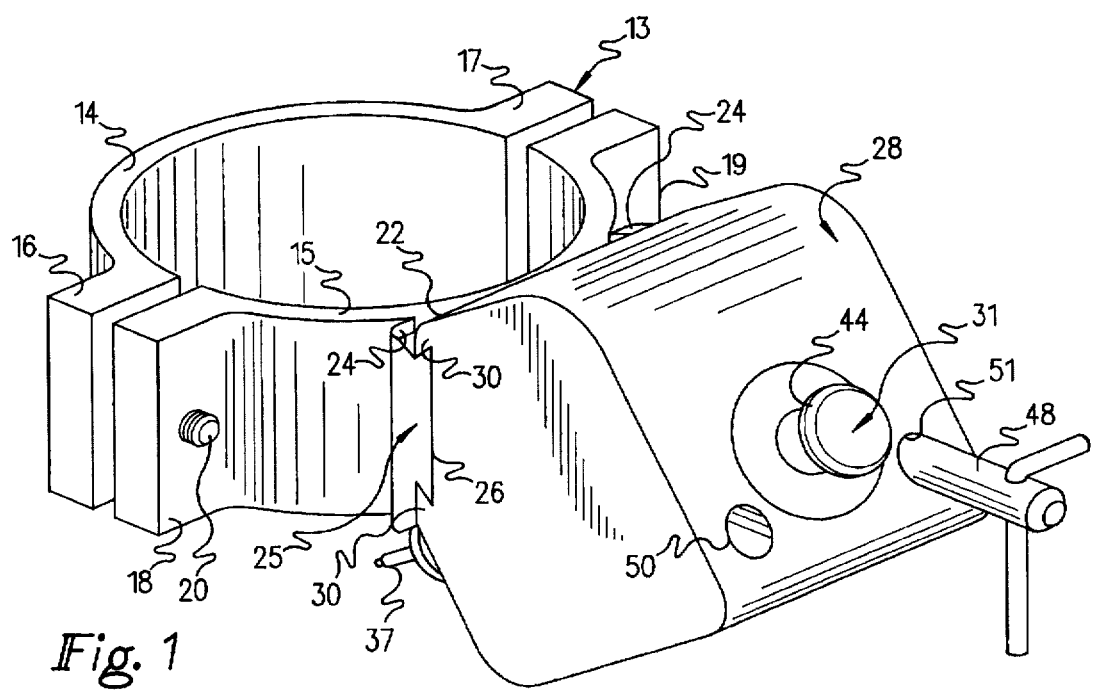
FIG. 1 is a perspective view of the microscope attached slide dotting device according to the present invention.

Referring now to the drawings, wherein like reference numerals designate corresponding structure through the views and referring in particular to FIGS. 1–7, a microscope attached slide dotting device according to the preferred embodiment will now be described.

Figure 2:
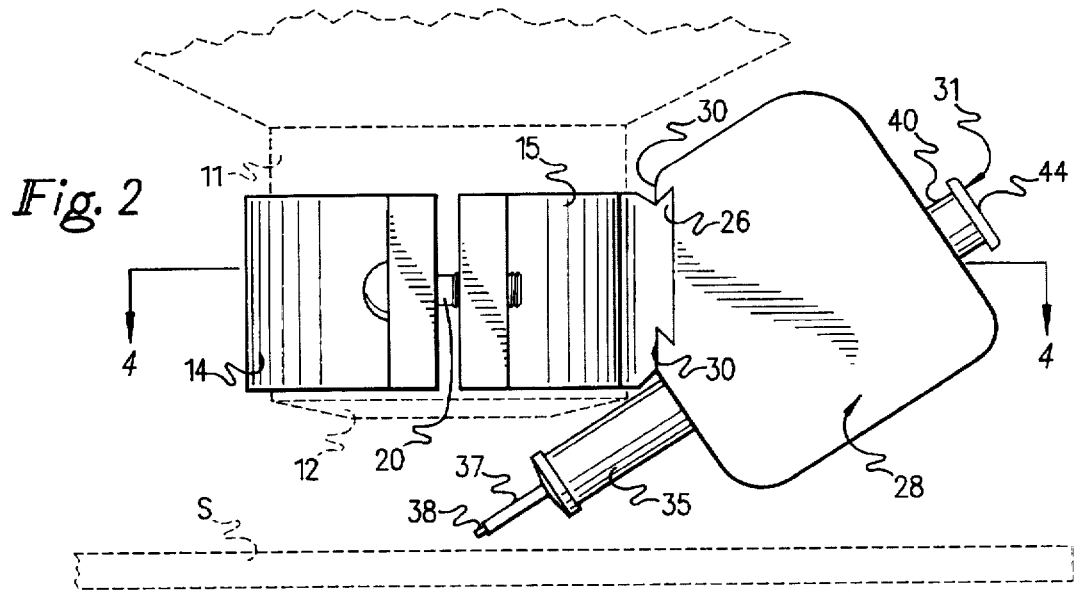
FIG. 2 is a slide elevation view of the microscope attached slide dotting device indicated as attached to a microscope.
Figure 3:
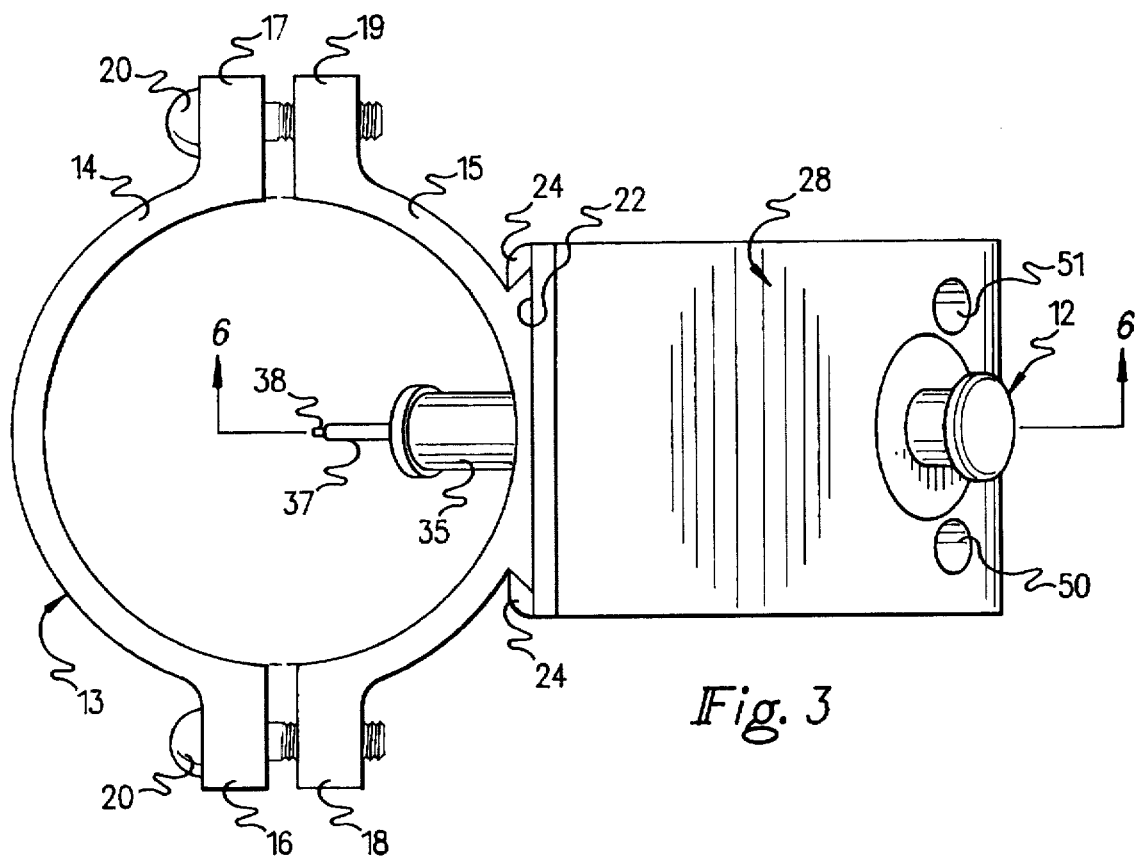
FIG. 3 is a top plan view of the microscope attached microscope dotting device according to the present invention.
Figure 4:
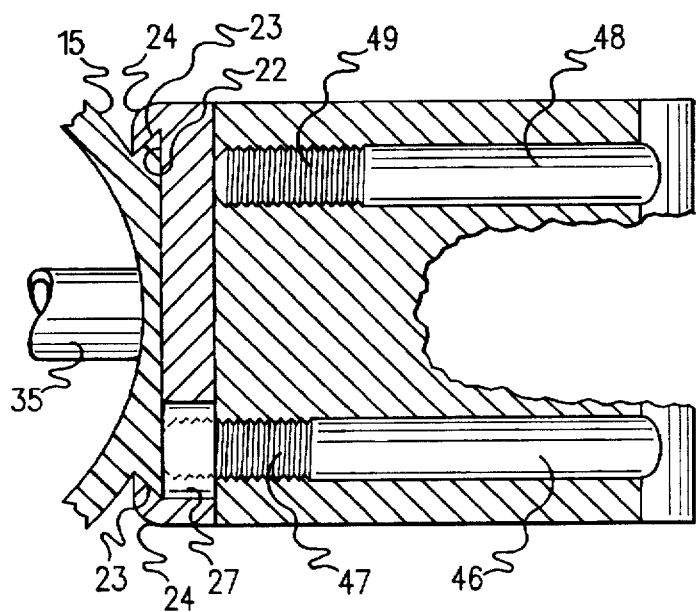
FIG. 4 is a cross-sectional illustration of the microscope slide dotting device, taken along the lines 4—4 indicated in FIG. 2 in the direction as indicated by the arrows.

Reference to FIGS. 1 and 2 indicates the microscope attached slide dotting device provided with a clamping ring 13. The clamping ring includes cooperative first and second semi-cylindrical members 14 and 15 respectively arranged for clamping about a microscope barrel 11 conveniently adjacent the objective lens 12 (see FIG. 2). The first semi-cylindrical member 14 includes projecting first and second flanges 16 and 17, with the second semi-cylindrical member 15 including projecting third and fourth flanges 18 and 19. The first flange 16 cooperates with the third flange 18, such that first fastener 20 secures the first flange 16 towards the third flange 18. In a like manner, the second flange 17 cooperates with the fourth flange 19, such that a second fastener 21 arranges to engage both the second and fourth flanges 17 and 19 respectively to draw them together. The cooperative first and second semi-cylindrical members 14 and 15 in this manner accommodates a microscope barrel 11 of varying dimension to clamp the device 10 thereto.

The second semi-cylindrical member 15 has fixedly secured thereto a mounting boss 22 projecting exteriorly of the second semi-cylindrical member 15. The mounting boss 22 includes opposed dovetail projections 23, with each of the projections 23 indicated as extending towards one of the flanges 18 and 19, such that a slide plate 25 (see FIGS. 1 and 5) complementarily and slidably receives the mounting boss 22, and specifically the opposed dovetail projections 23 within a first side of the slide plate 25. A second of the slide plate 25 includes a dovetail boss 26 projecting therefrom. The dovetail boss 26 terminates at opposed sides thereof, with opposed parallel receiving grooves to slidably accommodate a marker housing 28, as illustrated. An adjustment opening 27 (see FIGS. 4 and 5) extends through the slide plate 25 from the first side to the second side thereof, for purposes to be described in more detail below. It should be noted that the aforementioned grooves of the dovetail boss 26 orient orthogonally relative to the first plate flanges 24 projecting from the first side of the slide plate receiving the opposed dovetail projections 23 of the mounting boss 22.

The marker housing 28 includes a housing recess 29 bounded by opposed dovetail housing flanges 30 (see FIG. 5) for sliding engagement with the opposed grooves of the dovetail boss 26. In this manner, the marker housing 28 permits sliding in a first direction relative to the slide plate 25, with the slide plate 25 arranged in sliding engagement with the mounting boss 22 in a second direction generally orthogonally oriented relative to the first direction.

As illustrated, the housing recess directs into a first wall of the housing 28, wherein an opposed second wall of the housing 28 orients in a canted relationship relative to the first wall (FIG. 2), such that a marker assembly 31 extends from the second wall through a third wall and the marker assembly 31 in this manner extends below the clamping ring 13 and positioned a marking wick 38 of the marker assembly 31 between the objective lens 12 and a microscope slide "S" to be marked.

Reference to FIG. 6 indicates a first housing bore 32 extending into the marker housing 28 from the third wall, with the first housing bore 32 in coaxially aligned communication with a second housing bore of greater diameter than said first housing bore defining an abutment flange 34 at an interface of the first housing bore 32 to the second housing bore 33. The marker assembly 31 (see FIG. 6) includes a pen barrel 35 slidably extending into the first housing bore 32. The pen barrel (see FIG. 5) removably and securably receives a cartridge 36 having indicator fluid therewithin. The cartridge 36, typically disposable subsequent to its use, fits within the pen barrel 35 by a slight interference or snug fit. Alternatively the cartridge may be of a type permitting refilling or otherwise replenishment of indicator fluid. It is to be understood that various fastening structure may be employed to secure the cartridge 36 relative to the pen barrel 35 employing various mechanical fastening structures such as threads and the like, or alternatively adhesives may be employed if so desired permitting releasable securement of the cartridge 36 relative to the pen barrel 35. The cartridge 36 includes at a first distal end thereof a cartridge flange and guide tube 37 extending therefrom through which a marking wick 38 extends and projects. The marking wick 38 projects beyond the cartridge flange and guide tube 37 at a first end of the marking wick 38, with the second end of the marking wick 38 directed within the cartridge 36 for communication of and directing marking fluid through the wick.

Figure 5:
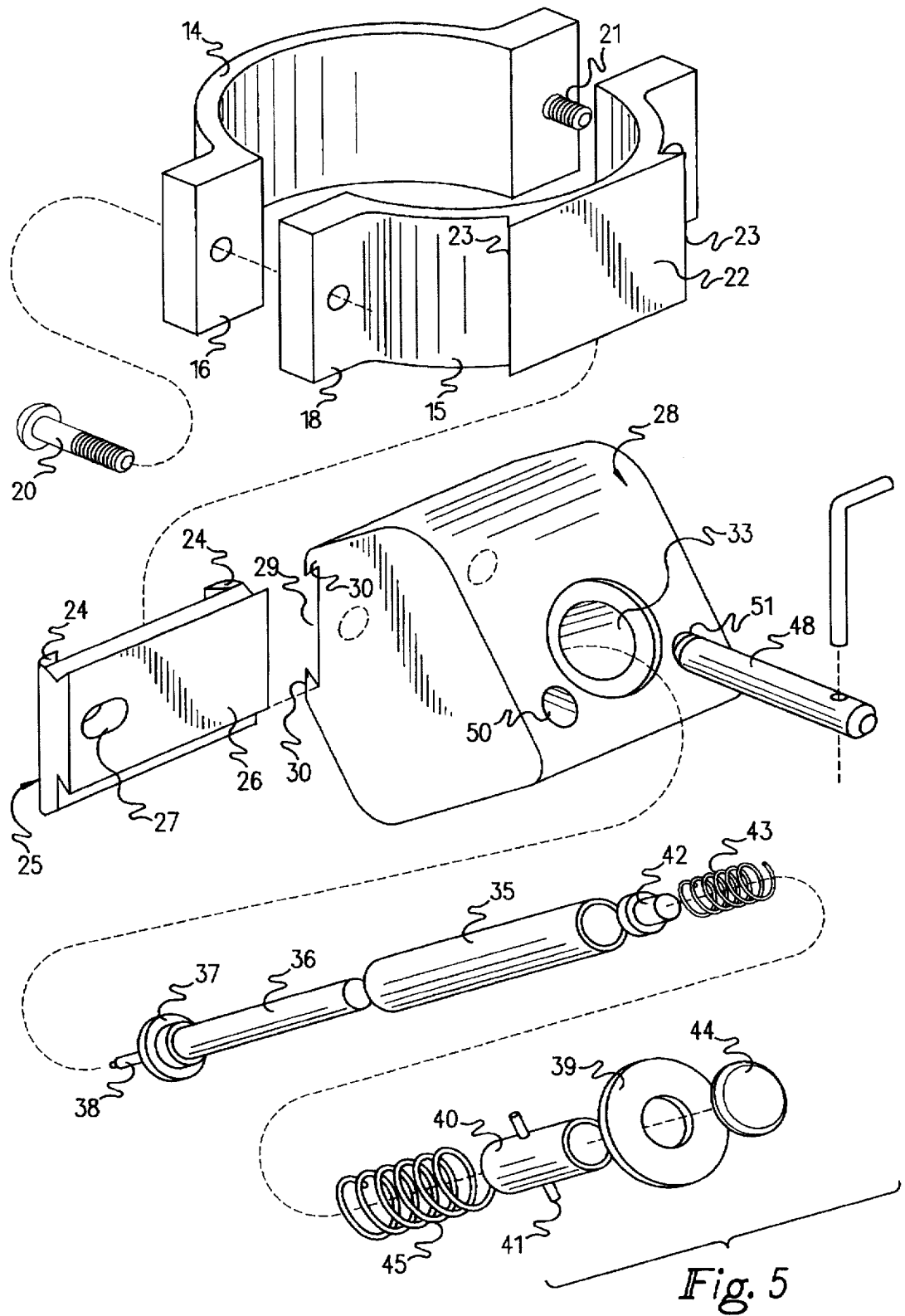
FIG. 5 is an exploded perspective illustration of the microscope attached slide dotting device indicating the various components and their inter-relationship.

Reference to FIGS. 1, 5, and 6 indicates a retainer plate 39 directed into the second wall of the marker housing 38 coaxially aligned relative to the first and second housing bore 32 and 33. The second housing bore 33, indicated in FIG. 5, extends from the first housing bore, with the second bore extending through the second housing wall, and the retainer plate 39 including an opening therethrough to accommodate a plunger 40 in a sliding relationship. The plunger 40 includes a stop pin 41 integral therewith to engage the retainer plate 39 within the second housing bore 33 preventing projection of the plunger 40 beyond the second wall of the housing 28 and thereby maintaining the plunger 40 within the second housing bore 33. A plunger cap 44 mounts onto the plunger 40 exteriorly of the marker housing 28, wherein within the housing 28, and more specifically, within the second housing bore 33, a return spring 45 is captured between the stop pin 41 and the aforementioned abutment flange 34 to bias the plunger 40 and associated marker assembly 31 in a spaced relationship relative to the microscope slide "S".

A guide lug 42 of a generally T-shaped cross-sectional configuration mounts within the pen barrel 35 at an opposed end relative to the cartridge flange and guide tube 37. A cushion spring 43 is received within the plunger 40 and extends from the plunger 40 to the guide lug 42. In this manner, initial force projects (see FIG. 7) the plunger 40 into the marker housing 28 to compress cushion spring 43 to cushion this force and thereby prevents undue force of engagement between the marking wick 38 and the underlying slide plate "S", in a manner as indicated in FIG. 7. Continued application of this force compresses return spring 45. Release of the plunger 40 and associated plunger cap 44 retracts the pen barrel 35 and projects the plunger cap 44 beyond the second wall of the marker housing 28, in a manner as indicated in FIG. 6.

Reference to FIGS. 1 and 3–5 indicates first and second lock fasteners 46 and 48 (see FIG. 4) extending through the marker housing 28 from the second wall through the first wall. The first and second lock fasteners 46 and 48 terminate in respective first and second lock fastener threaded portions 47 and 49 respectively, such that the first lock fastener 46 extends through the first wall of the marker housing 28, through the adjustment opening 27 of the slide plate 25 to engage the mounting boss 22 of the second semi-cylindrical member 15. This locks the marker housing 28 in a sliding relationship of the slide plate 25, marker housing 28 to the clamping ring 13 in a vertical direction, wherein selective loosening and clamping of the second lock fastener 48 adjusts and clamps selective sliding of the marker housing 28 relative to the slide plate 25 in a horizontal or second direction. The first lock fastener 46 received within a first fastener bore 50 threaded adjacent the first wall of the marker housing, with a second fastener bore 51 receiving the second lock fastener 48 therethrough, with the second fastener bore 51 threaded adjacent the marker housing first wall.

Subsequent to adjusting the marker housing relative to the clamping ring 13 in a manner employing the first and second lock fasteners as presented above, a user, as indicated in FIG. 7, employs the marker assembly 31 by directing the plunger 40 into the marker housing 28, in a manner as described above, for the dotting or marking of the underlying microscope slide "S".

It is to be understood, however, that numerous characteristics and advantages of the present invention have been set forth in the foregoing description, together with details of the structure and function of the invention, discloser is illustrative only. Changes may be made in detail, especially in the matters of shape, size, arrangement of parts within the principle of the invention to the full extent indicated by the broad general meaning of the terms in which the appended claims are expressed. For example, the adjustment opening 27 may be of any enlarged or convenient configuration to accommodate desired sliding adjustment of the slide plate 25 relative to the first lock fastener 46 upon loosening of the first and second lock fasteners 46 and 48.

What is claimed is:

1. A microscope slide dotting device for reference marking a microscope slide, comprising;
   a clamping member adjustably mountable to a lens objective of a microscope,
   a marking housing including a marker assembly longitudinally retained within a bore in said housing,
   a slide member including at least two dovetail portions slidably securing said marking housing to said clamping member for independent adjustment in at least two non-parallel directions, and
   a marker located at a distal end of said marker assembly and adapted to place a reference mark on a microscope slide upon activation of said marker assembly.

2. A device as set forth in claim 1 wherein the marker housing includes a first wall slidably securing the marker housing to the slide member, a second wall is spaced from the first wall, and a third wall is spaced from the second wall, with the marker assembly extending from the second wall through the third wall.

3. A device as set forth in claim 2 wherein the marker housing includes a first bore extending into the marker housing from the third wall, a second bore coaxially aligned and in communication with the first bore, and the second bore extends from the first bore to the second wall, and the marker assembly directed through the first bore and the second bore.

4. A device as set forth in claim 1 wherein the clamping member includes a first semi-cylindrical member and second semi-cylindrical member, at least one fastener directed through the first semi-cylindrical member and the second semi-cylindrical member to secure the first semi-cylindrical member and the second semi-cylindrical member together in a clamping relationship.

5. A device as set forth in claim 4 with a second fastener spaced from the first fastener, and the second fastener directed through the first semi-cylindrical member and the second semi-cylindrical member to secure the first semi-cylindrical member to the second semi-cylindrical member.

6. A device as set forth in claim 3 with the marker assembly including a pen barrel slidably directed through the first bore, the pen barrel having a cartridge member removably mounted relative to the pen barrel, the pen barrel projecting beyond the third wall, and the cartridge projecting beyond the pen barrel, the cartridge terminating in a marking wick.

7. A device as set forth in claim 3 with the marker assembly including a pen barrel slidably received within the first bore, a marker member terminating in a marker wick projecting beyond the pen barrel, and a plunger positioned within the second bore and extending beyond the second wall, with cushioning means extending between the pen barrel and the plunger to cushion force directed to the marking wick from the plunger.

8. A device as set forth in claim 7 wherein the cushioning means includes a spring, the spring received within the plunger and extending to and in communication with the pen barrel.

9. A device as set forth in claim 7 including a return spring oriented exteriorly of the cushioning means and oriented exteriorly of the pen barrel, with the return spring positioned within the second bore and extending into engagement with the plunger.

10. A device as set forth in claim 9 with the return spring oriented coaxially of cushion means.

11. A microscope slide dotting device arranged for selective securement to a microscope, wherein the device comprises,
    a clamping ring, the clamping ring including a mounting boss projecting beyond the clamping ring,
    a slide member slidably secured to the mounting boss along a first direction,
    a marker housing slidably secured to the slide member along a second direction, and
    marker means arranged for projecting through the marker housing and for projecting beyond the marker housing for marking a microscope slide spaced from the microscope.

12. A device as set forth in claim 11 wherein the slide member includes a slide member first side spaced from a slide member second side, the slide member first side slidably receives the mounting boss therewithin, a slide member boss projects from the slide member second side, and the marker housing includes a marker housing recess to receive the slide member boss in a sliding relationship.

13. A device as set forth in claim 12 wherein the slide member includes a slide member opening directed through the slide member from the first side through the second side, the marker housing including at least one fastener directed through the marker housing and through the slide member opening into selective engagement with the mounting boss.

14. A device as set forth in claim 13 with the marker housing including a first wall receiving the slide member therealong, a second wall spaced from the first wall, and a third wall spaced from the second wall, with the marker means extending through the first wall and the third wall and the at least one fastener extending through the third wall, through the first wall of the marker housing.

15. A device as set forth in claim 14 including a second fastener spaced from the first fastener, the second fastener extending through the third wall and the first wall into selective engagement with the slide member.

16. A device as set forth in claim 12 with the first direction and the second direction arranged in an orthogonal relationship relative to one another.

17. A device as set forth in claim 11 with the clamping ring having a first semi-cylindrical member and a second semi-cylindrical member, the first semi-cylindrical member including a first flange spaced from a second flange, the second semi-cylindrical member including a third flange spaced from a fourth flange, a first fastener directed through the first flange and the third flange, and a second fastener directed through the second flange and the fourth flange.

18. A device as set forth in claim 11 where the mounting boss includes opposed dovetail projections, and the slide plate includes opposed flanges to receive the opposed dovetail projections.

19. A device as set forth in claim 11 wherein the marker housing includes opposed housing flanges and the slide plate includes opposed grooves, wherein each of said grooves receives one of said housing flanges.

20. A microscope attached slide dotting device arranged for mounting to a microscope adjacent to an objective lens, wherein the device comprises, a clamping ring, the clamping ring including cooperative first and second semi-cylindrical members, the first and second semi-cylindrical members including at least one fastener to secure the first and second semi-cylindrical members together, the second semi-cylindrical member including a mounting boss projecting beyond the second semi-cylindrical member, with the mounting boss including opposed dovetail projections, and a slide plate, the slide plate including a first side spaced from a second side, the first side defining opposed slide plate flanges to complementarily and slidably receive the opposed dovetail projections therewithin, a marker housing including a first wall spaced from a second wall, and at least a third wall spaced from the second wall, the first wall including a housing recess arranged to complementarily and slidably receive the dovetail projections therewithin.

a marker assembly directed through the first wall and the third wall of the marker housing, the marker assembly including a pen barrel projecting beyond the third wall slidably and retractably directed through the marker housing within a first bore, a second bore in communication with the first bore within the marker housing, and the second bore extending from the first bore through the second wall, with second bore defined by a second diameter, and the first bore defined by a first diameter, and the second diameter greater than the first diameter, with an abutment flange oriented at an interface between the first bore and the second bore, a plunger slidably received within the second bore, and a cushion member spring extending from the plunger to the pen barrel, and a return spring in surrounding relationship relative to the cushion member spring extending from the abutment flange to the plunger, with the plunger extending beyond the second wall and arranged for reciprocation through the second wall.

\* \* \* \* \*